(12) United States Patent
Willett

(10) Patent No.: US 8,389,907 B2
(45) Date of Patent: Mar. 5, 2013

(54) HEATING ELEMENT ARRANGEMENT FOR BAKER'S OVEN

(75) Inventor: Paul Eaton Willett, Whiteside (AU)

(73) Assignee: Moffat Pty Limited, Mulgrave (AU)

( * ) Notice: Subject to any disclaimer, the term of this patent is extended or adjusted under 35 U.S.C. 154(b) by 477 days.

(21) Appl. No.: 12/607,311

(22) Filed: Oct. 28, 2009

(65) Prior Publication Data

US 2010/0126979 A1     May 27, 2010

(30) Foreign Application Priority Data

Oct. 31, 2008 (AU) .................................. 2008905623
Oct. 31, 2008 (AU) .................................. 2008905630

(51) Int. Cl.
    *F27D 5/00*     (2006.01)
(52) U.S. Cl. ........................... 219/392; 99/324
(58) Field of Classification Search .................. 219/392; 99/324
See application file for complete search history.

(56) References Cited

U.S. PATENT DOCUMENTS

| | | | |
|---|---|---|---|
| 1,433,598 A | 10/1922 | Bolling | |
| 4,757,184 A | 7/1988 | Swanson | |
| 6,250,210 B1 | 6/2001 | Moreth | |
| 6,408,842 B1 | 6/2002 | Herrera | |
| 7,193,184 B1 | 3/2007 | Manning | |
| 7,985,944 B2 * | 7/2011 | Willett | 219/401 |
| 2007/0246451 A1 * | 10/2007 | Willett | 219/394 |
| 2008/0083728 A1 | 4/2008 | Hanson | |
| 2008/0257878 A1 * | 10/2008 | Willett | 219/401 |
| 2010/0140250 A1 * | 6/2010 | Willett | 219/428 |

FOREIGN PATENT DOCUMENTS

| | | |
|---|---|---|
| GB | 2 063 045 A | 6/1981 |
| GB | 2 129 272 A | 5/1984 |
| GB | 2 245 136 A | 1/1992 |
| WO | 2005/013697 A1 | 2/2005 |
| WO | WO 2005013697 A1 * | 2/2005 |
| WO | 2008089611 A1 | 7/2008 |

OTHER PUBLICATIONS

Extended European Search Report mailed Apr. 12, 2012, issued in corresponding European Application No. EP 09 17 4208, filed Oct. 27, 2009, 10 pages.

* cited by examiner

*Primary Examiner* — Chuong A Luu
*Assistant Examiner* — Robert Bachner
(74) *Attorney, Agent, or Firm* — Christensen O'Connor Johnson Kindness PLLC

(57) ABSTRACT

A baking oven 10 comprising an oven chamber 11, heating elements 20, 120 for generating heat, a support 14, 114A for supporting one or more baking trays 30 in a baking tray position within the heating chamber 11. The oven has an active region 120 under the baking tray position and an inactive region 130 positioned outwardly of the active region 120, the heating elements 20 being positioned to provide substantially more heat to the active region 120 than to the inactive region 130 for more directly heating an underside of the baking tray position. The oven chamber 11 may also include second support 114B within the oven chamber for supporting one or more baking trays above the baking trays on the first support 14 and second heating elements 127 intermediate the first support and a second support for supplying heat to an underside of the baking trays on the second support 114B; the second support 114B being movable relative to the second heating elements 127 and coaxial with the first support 20, 114A.

22 Claims, 9 Drawing Sheets

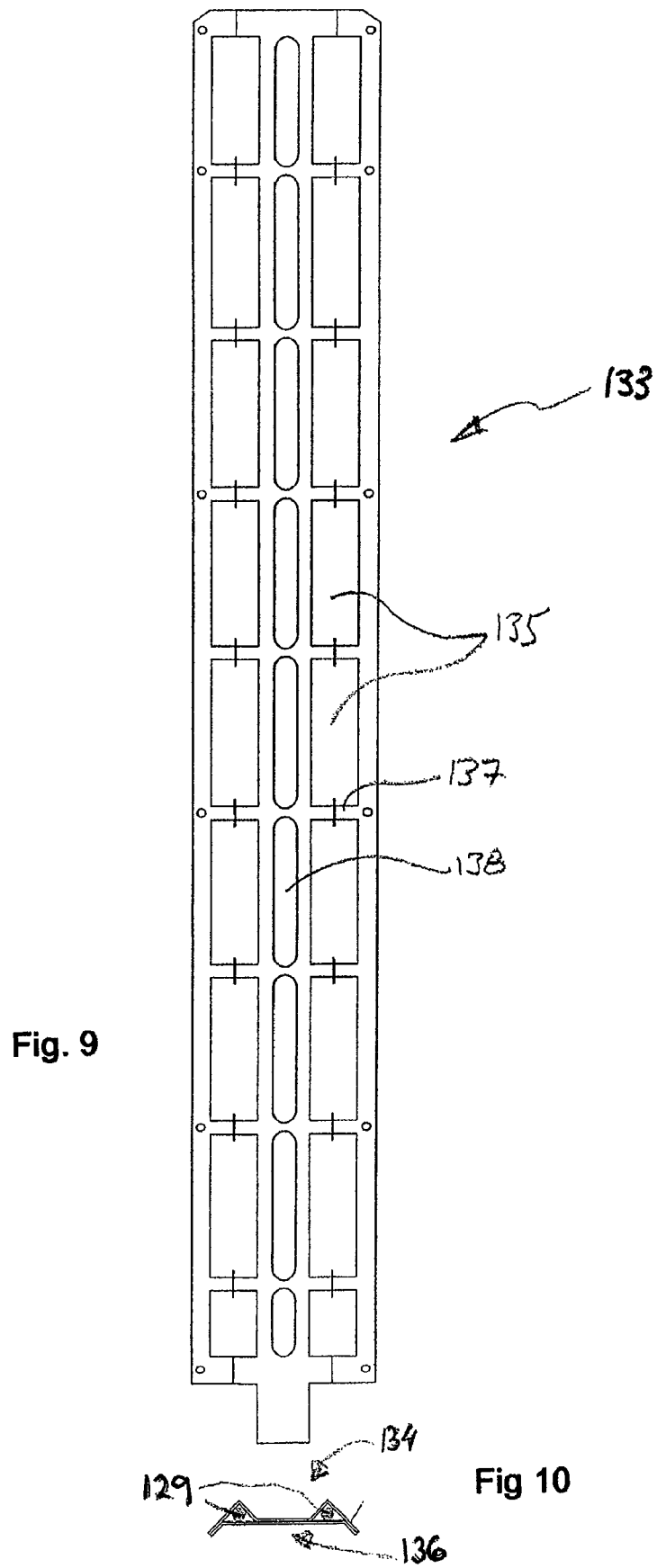

HEATING ELEMENT ARRANGEMENT FOR BAKER'S OVEN

FIELD OF THE INVENTION

The invention relates to a baker's oven and in particular to the heating element arrangements in a baker's ovens.

BACKGROUND OF THE INVENTION

A previously disclosed baker's oven comprises a number of stacked oven compartments with individual oven doors at the front. Each level of the oven includes two components with each compartment generally having a turntable onto which baking trays or bread pans or a like can be loaded.

The oven compartments are heated by electric heating elements in the bottom and top of the compartments. The heating elements are formed as single heating units comprising a number of parallel arms connected in series by U-shaped elements. The parallel arms extend from the oven door to the rear of the compartment and are spaced across the width of the oven.

The top and bottom heating elements can be separately controlled to vary the heat distribution within the oven. For certain types of baked goods, it is advantageous to supply the heat predominantly from the bottom of the oven whilst maintaining the oven at a constant temperature.

Steam can be introduced in controlled manner into the oven compartment of the baker's oven to create glazed buns, "split" crusts or bakery products such as bread and rolls. One means of introducing steam into baker's ovens is to use external steam generators and introduce the steam into the oven through a conduit connecting the steam generator to the oven. This method of steam generation requires an additional steam generator and is thought to be inefficient, not only in terms of the overall heat requirements of the baking and steam generation process but an external steam generator uses up valuable bakery space.

In recent years to avoid the need for external steam generators, water has been sprayed into the oven compartments for conversion into steam. This creates problems for designers and manufacturers of baker's ovens in that the heat energy required to convert water into steam must not be so large as to cause the internal temperature in the compartments to drop more than say 5-10° C., or the quality of the finished baked products may be adversely affected.

Secondly, all of the water must be converted into fine steam before it comes into contact with the bakery products, as impingement of even very small water droplets on the surface of the baker products adversely affects the surface appearance thereof.

A further complication has arisen with the adoption of ceramic surfaces, e.g., ceramic tiles, on the oven turntables on which the products are baked. If the steam is sprayed directly at the ceramic surfaces, they will absorb the steam and the quantity of steam available to the baker's products is minimized.

Australian Patents Nos. 666365, 666633 and 669838, all in the name of APV Australian Pty Ltd, all disclose an internal steaming assembly for a baker's oven in which the parallel rods of the lower heating element in the oven compartments are positioned in the vicinity of a ballast bar. Water from a water supply pipe is sprayed onto the heated ballast bar at the front of the oven compartment and the resulting generated steam left to circulate in the oven compartment. Apart from a plate over the section of the ballast bar adjacent the water pipe to prevent splashing, the ballast bar is not covered and is exposed to debris such as product overflow falling from the rotating turntables onto the hot heating rods. This debris bakes onto the heating rods and ballast bars and must be regularly cleaned from the rods and ballast bars for heating efficiency and product quality reasons.

Australian Patent Application No. 2004262443 discloses a heating element fixed to an elongate steam generation chamber for more effectively generating steam. The contents of Australian Patent Application No. 2004262443 are herein incorporated by a reference.

It has been discovered that, particularly during the early stages of baking when the baking trays are relatively cool, steam from the underlying steam generators can impinge on the underside of the baking tray or turntable where it condenses. This results in a loss of effective steam from the oven cavity. This loss of steam has been found to affect the quality of the baked product.

It is an object of the present invention to provide a heating arrangement that improves the heat distribution within a baking oven, improves the steam supply for a baking oven or at least provides alternatives to existing arrangements in the marketplace.

SUMMARY OF THE INVENTION

It has been discovered that by concentrating the active portions of the heating elements more directly under the baking trays the quality of baked goods can be improved. This has been found to be associated with supplying the heat more directly to the underside of the baking trays. It has also been found that by moving the steam outlets outwardly away from a region underlying the baking trays, the impingement of the steam on the underside of the baking trays can be reduced, thereby improving the distribution of steam within the oven compartment.

Accordingly, in a first aspect of the invention, there is provided a baking oven comprising:
   at least one oven chamber;
   at least one heating means for generating heat;
   at least one support means for supporting one or more baking trays in a baking tray position within the heating chamber;
   wherein the oven chamber has an active region under the baking tray position and an inactive region positioned outwardly of the active region, the heating elements being positioned to provide substantially more heat to the active region than to the inactive region for more directly heating an underside of the baking tray position.

The oven chamber preferably includes heating elements extending from a wall of the oven into the active region, each element having an inactive portion and an active portion, the inactive portion extending from the wall to the active portion, which extends within the active region for more directly heating an underside of the baking tray position.

In an advantageous arrangement, the oven chamber includes a carousel or rotatable turntable for supporting the baking trays. In this instance the active region may be defined by an outer most periphery of the baking tray position as it is rotated on the carousel. Alternatively, the active portions of the elements may lie within a region defined by an inner most portion of the outer periphery of the baking tray position as it is rotated on the turntable. Ideally, the baking tray position defines a rectangle centered on an axis of rotation of the turntable and the active region outer boundary is defined as being within a circle defined by rotation of an outer most corner of the rectangle. Preferably the active region outer boundary is defined as being between a circle defined by rotation of an outer most corner of the rectangle and a circle defined by rotation of the nearest approach of an edge of the rectangle to the axis, and the active region outer boundary is most preferably half way between a circle defined by rotation of an outer most corner of the rectangle and a circle defined by rotation of the nearest approach of an edge of the rectangle.

The best results are obtained when the heating elements are arranged to provide more than 2 times greater power density to the active region than to the inactive region. Preferably the heating elements are arranged to provide 2.5 to 3.5, and most preferably 2.9 to 3.1, times greater power density to the active region than to the inactive region.

Advantageously at least one of the heating elements includes a steaming device, the steaming device having at least one steam outlet configured for venting steam substantially outside of the active region. Most preferably the at least one steam outlet is positioned close to the peripheral wall.

Preferably the heating elements are relatively narrow, thereby allowing the heating elements to be more densely concentrated within the active region. Each heating element may include two elongate heating element portions and a steam generation chamber positioned intermediate and operably connected to the elongate heating element portions and having at least one steam outlet. The steam generation chamber may be provided with at least one heat sink member to provide a heat source to convert water introduced into the steam generation chamber into steam.

A water pipe can be provided to direct water into the steam generation chamber.

The elongate heating element portions may be heating rods with each housed in a heating chamber. The heating chambers may include an outlet, and most preferably a plurality of outlets, to enable the transfer of heat from the heating rod to the oven compartment.

The heat sink may be a strip of metal bar having a thermal mass sufficient to convert an amount of water to steam sufficient to produce the necessary baking environment.

In a second aspect of the invention, there is provided a heating element for a baking oven having an inactive region and an active region, the heating elements comprising an inactive portion and an active portion, the inactive portion being arranged to extend from the wall of the oven over the inactive region of the oven, the active portion extending from the inactive portion into an active region of the oven for underlying baking trays in the oven.

It has further been discovered that by concentrating the heating means in a region underlying the baking trays, it is possible to control the application of heat to the oven chamber and to the bakery products to an extent that an additional layer of baking trays can be included in the oven chamber and produce satisfactory bakery product.

Thus, the heating means in the lower part of the oven is a first heating means underlying a first support means. According to a preferred form of the first aspect of the invention, there is provide a second support means within the oven compartment for supporting one or more baking trays above the baking trays on the first support means; and a second heating means intermediate the first support means and a second support means for supplying heat to an underside of the baking trays on the second support means; the second support means being movable relative to the second heating means.

Further a third heating means may be provided intermediate the second support means and the ceiling of the oven for supplying heat to the bakery product on the baking trays on the second support means. Preferably, shield means are provided to shield the bakery product on baking trays on the first support means from the second heating means.

According to a third aspect of the invention, there is provided a baker's oven including:
- at least one insulated oven compartment having a floor and a ceiling;
- a first support means within the at least one oven compartment for supporting one or more baking trays above the floor;
- a first heating means intermediate the floor and the first support means for supplying heat to an underside of the baking trays on the first support means;
- the first support means being movable relative to the first heating means;
- a second support means within the oven compartment for supporting one or more baking trays above the baking trays on the first support means; and
- a second heating means intermediate the first support means and a second support means for supplying heat to an underside of the baking trays on the second support means; the second support means being movable relative to the second heating means.

The best results are obtained when a third heating means is provided intermediate the second support means and the ceiling for supplying heat to the bakery product on the baking trays on the second support means. Preferably, shield means are provided to shield the bakery product on baking trays on the first support means from the second heating means. The shield means is preferably in the form of a metallic sheath surrounding the second heating means, the sheath including apertures on an upper side for transferring heat to the underside of the baking trays on the second support means.

According to preferred forms of the above aspects of the invention, the first support means and the second support means are preferably configured so that, in use, the baking trays on the first support means and the baking trays on the second support means are at least approximately aligned so that a centre of the trays on the second support means overlies a centre of the trays on the first support means. Most preferably, the first support means and the second support means are configured to hold trays of the same size and shape. It is preferable that the first support means is a rotatable turntable mounted to rotate about an axis within the oven compartment. The second support means may also be a rotatable turntable mounted to rotate about an axis in the oven compartment and preferably the first and second support means are coaxially mounted. The rotation of the support means relative to the respective heating elements assists in preventing localized burning on the bottom of the product.

The first heating means is preferably configured to supply heat at least predominately to a first active region underlying the baking trays on the first support means to more directly heat the underside of the baking trays on the first support means. The first active region is preferably 63% to 69%, more preferably 66%, of the size of the floor by area.

The second heating means is preferably configured to supply heat at least predominantly to an active region underlying the baking tray on the second support means to more directly heat the underside of the baking trays on the second support means. The second active region is preferably 46% to 54%, more preferably 50%, of the size of the floor by area.

To clarify, "the size of the floor by area" as used herein refers to the horizontal area occupied by the floor—i.e., the area is not increased by corrugations/surface texture etc.

The second heating means is preferably configured to in use deliver between 70-80% of the power of the first heating means.

One or both of the first heating means and the second heating means may include one or more elements, each element comprising an inactive portion and an active portion, the inactive portion being arranged to extend from the wall of the oven over the inactive region of the oven, the active portion extending from the inactive portion into an active region of the oven for underlying baking trays in the oven.

Preferably the heating elements are relatively narrow, thereby allowing the heating elements to be more densely concentrated within the active region or the central active region.

The elongate heating element portions may be heating rods with each housed in a heating chamber. The heating chambers may include an outlet, and most preferably a plurality of outlets, to enable the transfer of heat from the heating rod to the oven compartment.

BRIEF DESCRIPTION OF THE DRAWINGS

FIG. 9 is a plan view of the second heating elements of the oven chamber of FIG. 6;

FIG. 10 is a plan view of a shield; and

DETAILED DESCRIPTION OF THE EMBODIMENTS

Figure 1:
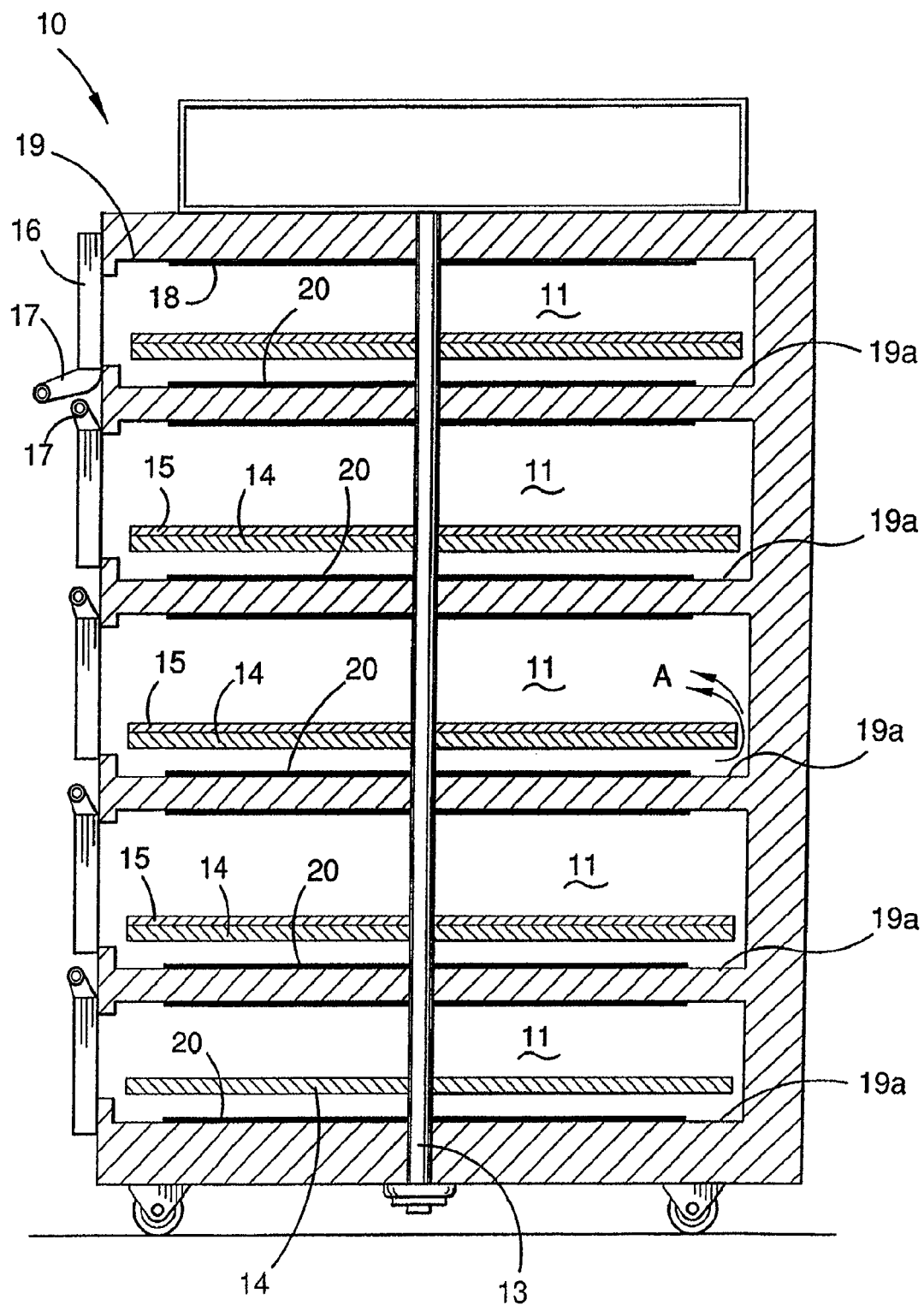
FIG. 1 is a sectional side view of a five level rotary baker's oven in accordance with an embodiment of the present invention.
Figure 2:
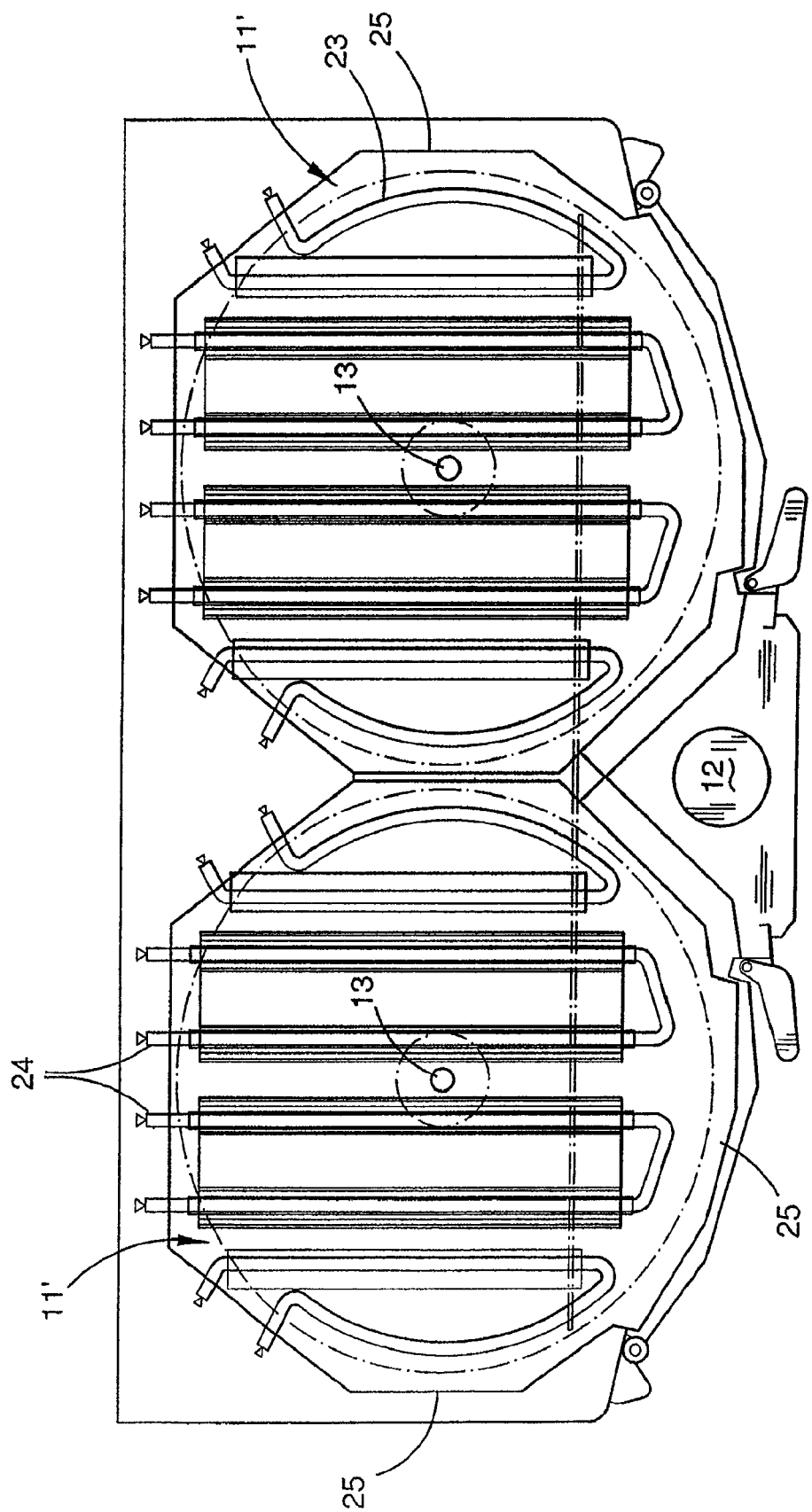
FIG. 2 is a sectional plan view showing one level of a previously disclosed oven.

Referring to FIGS. 1 and 2, the baker's oven is a rotary oven 10 similar to the type sold under the registered trade mark "ROTEL". In the embodiment illustrated, the oven has five levels with two oven compartments 11 on each level. A drive motor 12 (not shown) is operably connected to a pair of vertical shafts 13 on which are mounted turntables 14, which may incorporate optional ceramics "tiles" 15 on which the baking trays (not shown) are cooked. Each oven compartment 11 has an oven door 16 operably openable and closable by a handle 17.

Each oven compartment 11 has top heating elements 18 mounted to the underside of the top wall 19 of the oven compartment 11. As shown in more detail in FIG. 3, each oven compartment 11 has a pair of substantially U-shaped bottom heating elements 20 mounted on the bottom wall 19a. The operation of the heating elements 20 is controlled by a computerised control system (not shown), which also controls the operation of the steaming apparatus to be hereinafter described.

By selectively energizing the upper heating element 18 and the lower heating element 20 it is possible to control:

1. The air temperature within the oven chamber,

2. The heat rising directly from the lower heating element 20 to the bottom of the turntable 14 and thus the baking trays 30, and 3. The heat radiating from the upper heating elements 18.

For example, by supplying more electrical power to the lower element 20, it is possible to supply more heat to the bottom of the turntable 14 and thus baking trays 30. This could be used to produce, for example, bread having more bottom crust and a darker baked color on top.

It has been found that the position of the steam generation devices and the heating elements have a large bearing on the quality of the baked product. This has been found to be related to the control over the application of heat to the lower surfaces of turntable 14 and baking trays 30. It has been found that by concentrating the heating elements under the baking trays, it is possible to provide a more concentrated heat to the underside of the turntable 14 and baking trays 30 and thereby have greater control over the above listed variables. The result is a baking oven that can be used to produce an improved baked product.

Figure 3:
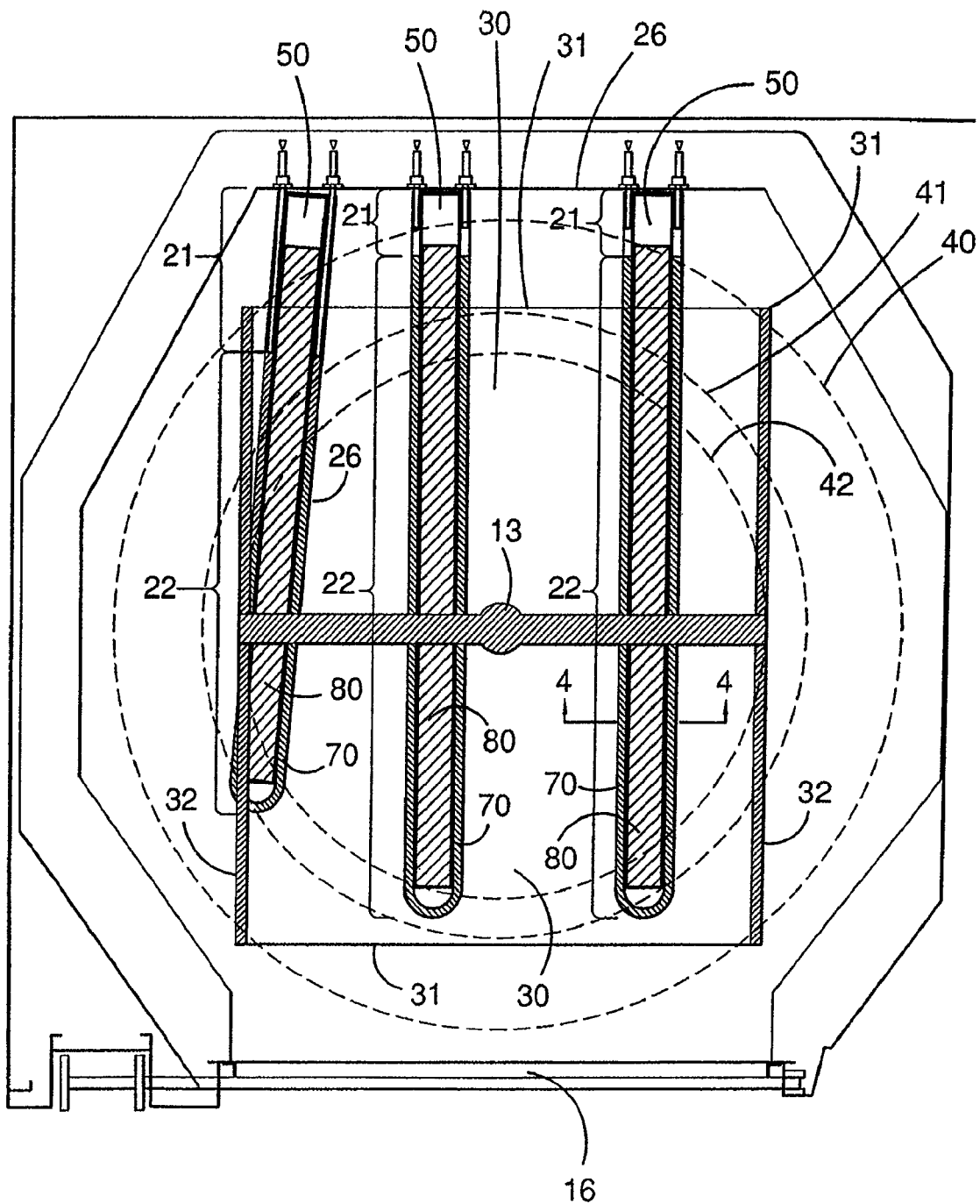
FIG. 3 is a sectional plan view of one side of one of the levels of the oven of FIG. 1 showing the heating elements and the baking trays.
Figure 4:
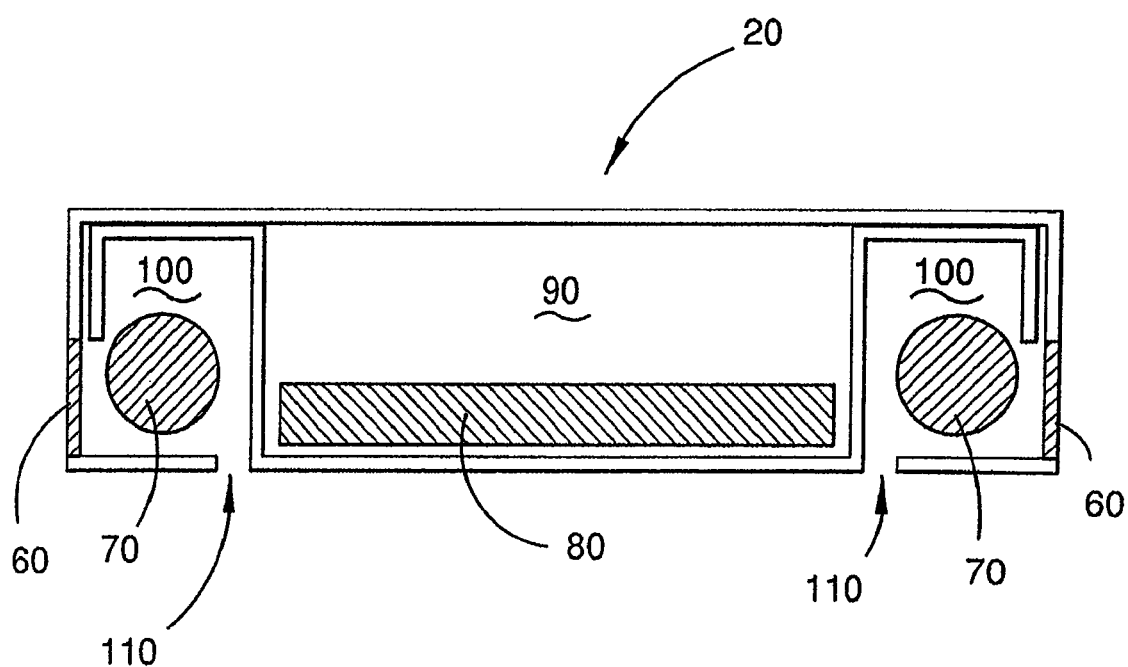
FIG. 4 is a sectional view along the line 4-4 shown in FIG. 2 showing a cross section of the heating element.

FIG. 3 shows a cross sectional plan view of one side of the oven of FIG. 1. It shows a potential layout of the heating elements 20 and the relative positioning of the baking trays 30 when in use. The baking trays 30 are in the baking tray position. The turntable 14 is omitted from this view for clarity. As illustrated the heating elements 20 are relatively narrow elongate members. This allows the heating elements 20 to be more closely spaced and positioned under the baking trays 30. Only three elements 20 are illustrated here for clarity although of course it is possible to use more. This concentration of heating elements differs from conventional oven design, which would have a number of widely spaced heating element portions evenly distributed across the oven floor to produce a more even distribution of heat throughout the baking chambers.

As illustrated in FIG. 2, previously disclosed ovens have widely spaced heating elements evenly spread across the baking chamber 11 including providing heating element portions 23 close to peripheral wall 25.

To give an idea of scale, each baking tray 30 is about 18 inches (460 mm) by about 30 inches (720 mm) and the trays are spaced by the shaft 30 which is about 1 inch (25 mm) thick. Thus the two trays being spaced by the shaft FIG. 13 define a rectangle of about 37 inches (940 mm) by about 30 inches (720 mm).

According to the invention, each heating element 20 is provided with an inactive portion 21 and an active portion 22. The inactive portion 21 does not produce heat. The active portion 22 produces heat. Each active portion 22 has a more or less homogenous constructions but produces little or no heat along a length of 25 mm or so adjacent the inactive portion 21. The heating element extends from a rear wall 26, which partly defines the periphery of the oven compartment 11 with the inactive portion 21 of the heating element spanning an inactive region of the oven. The active portion 22 of the heating element extends from the inactive portion 21 into the active region of the oven beneath the baking trays 30.

It has been found that an improved distribution of heat within the baking chamber can be achieved by positioning the active portions 22 within the region 40 described by the outer most corner 31 of the baking trays as it is rotated about the shaft 13. This region is herein referred to as the active region. The shorter heating element 20' is arranged so that the active portion 22 lies predominantly within a smaller active region 41. The smaller active region 41 is defined by the nearest approach of the farther surfaces 31 of tray 30 to the shaft 13 as it is pivoted about shaft 13. Advantageous results have been achieved if the active portions 22 are confined to innermost active region 42 defined by the inner most approach of edge 32 of trays 30 as it rotates around shaft 13. The positioning of the active portions 22 within this innermost active region 42 means that the active regions are always directly underneath the baking tray as it is rotated about shaft 13.

Figure 5:
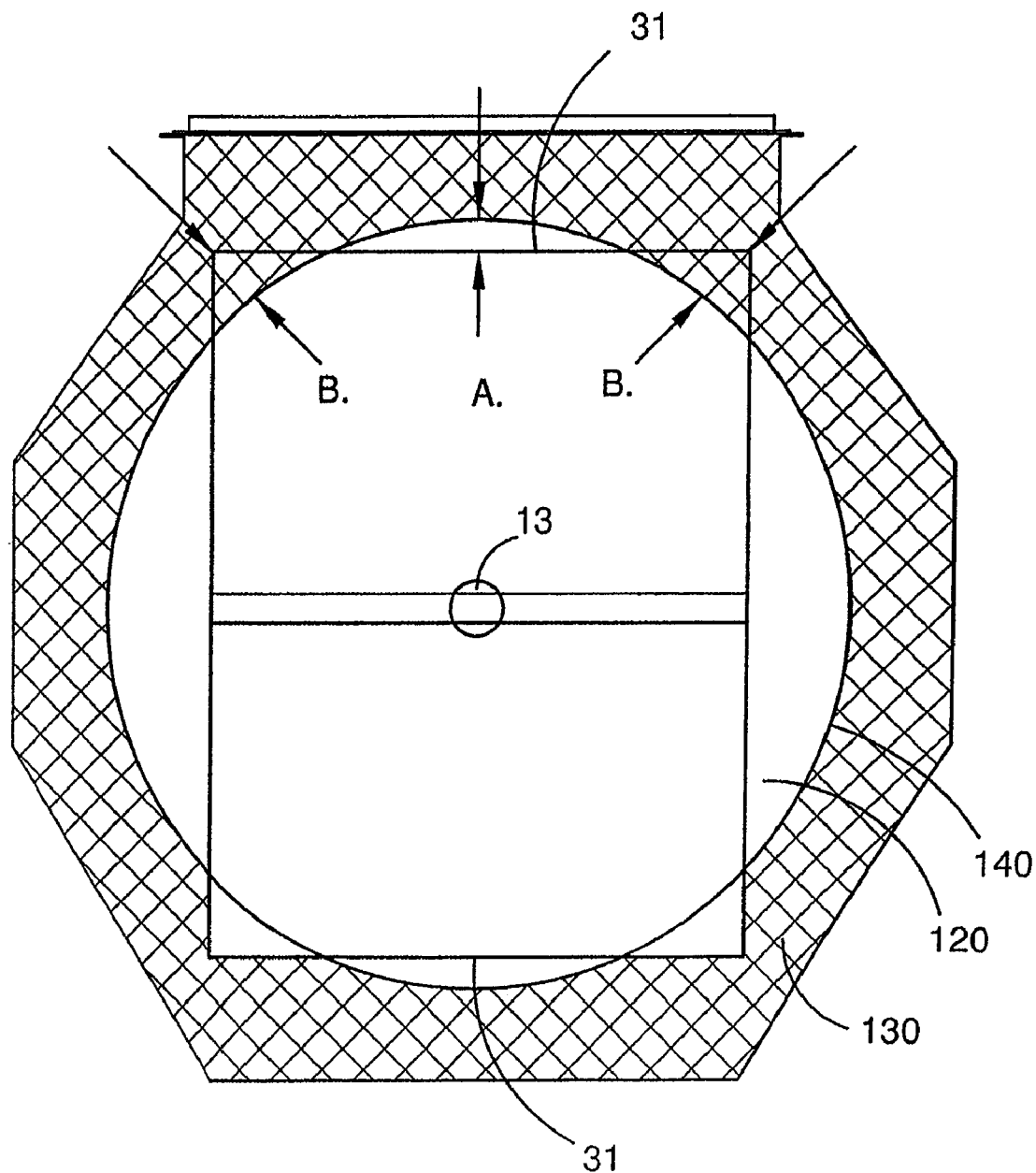
FIG. 5 is a schematic sectional plan view illustrating the location of the active region.

FIG. 5 illustrates the ideal location of the boundary 140 between the active region 120 and the inactive region 130. The boundary 140 in this case is calculated with respect to the nearest and furthest extents (relative to the central axis 13) of the edge 31 such that the dimension B is equal to twice of dimension A. Power densities of 0.133 W/cm$^2$ and 0.4 W/cm$^2$ in the inactive and active regions respectively have been found to be ideal.

Each heating element 20 incorporates a steam generating device. The steam generating device allows steam to be generated using heat from the heating elements. Each heating element has a steam outlet 50 for venting steam into the oven chamber. As illustrated the outlets 50 are positioned predominantly outside of the active region 40 and closely adjacent to the rear wall 26. In this way, steam vented from the outlets 50 enters the oven chamber without directly impinging on the turntable 14 or baking trays 30. Condensation, particularly during the early stages of baking, is thereby avoided thus improving the availability of steam within the baking chamber. The condensation of steam on the lower side of the baking tray has also been found to have a detrimental effect on heat distribution.

Each heating element 20 includes a steam generation chamber 90 positioned intermediate elongate heating element portions 70. Within the steam generation chamber is a metallic strip 80, which serves as a heat sink. The heat sink 80 absorbs heat from the elongate heating element portions 70. When it is desirable to create steam within the cavity, water is supplied to the steam generation chamber 90 and is vaporized by the stored thermal energy in the heat sink 80. This allows for rapid generation of steam without significant loss of temperature within the oven chamber. The elongate heating element portions 70 are housed within heating chambers 100. The heating chambers 100 have outlets 60 spaced along their length and inlets 110 also spaced along their length. In use air is drawn through the inlets 110 and driven through the heating chambers 100 and out via outlets 60 by convection. This allows for efficient heat transfer from the elongate heating element portions 70 to the oven chamber 11. As discussed in Patent Application No. 2004262443, the closed construction of the heating element and steam generation device advantageously minimizes fouling and prevent debris baking onto the heating element. This arrangement allows the water to be injected into the steam generation chamber 90 at a location spaced from the outlet 50, thereby ensuring that the water is fully vaporized before venting through outlet 50.

This new steam generator construction includes a single steam generation chamber spaced intermediate heating element portions 70 advantageously allows for a narrower heating element design, thereby allowing greater design flexibility in positioning of the heating elements. In particular it is possible to position the heating elements more closely and thereby have a greater concentration of heating elements within an active heating region.

Figure 6:
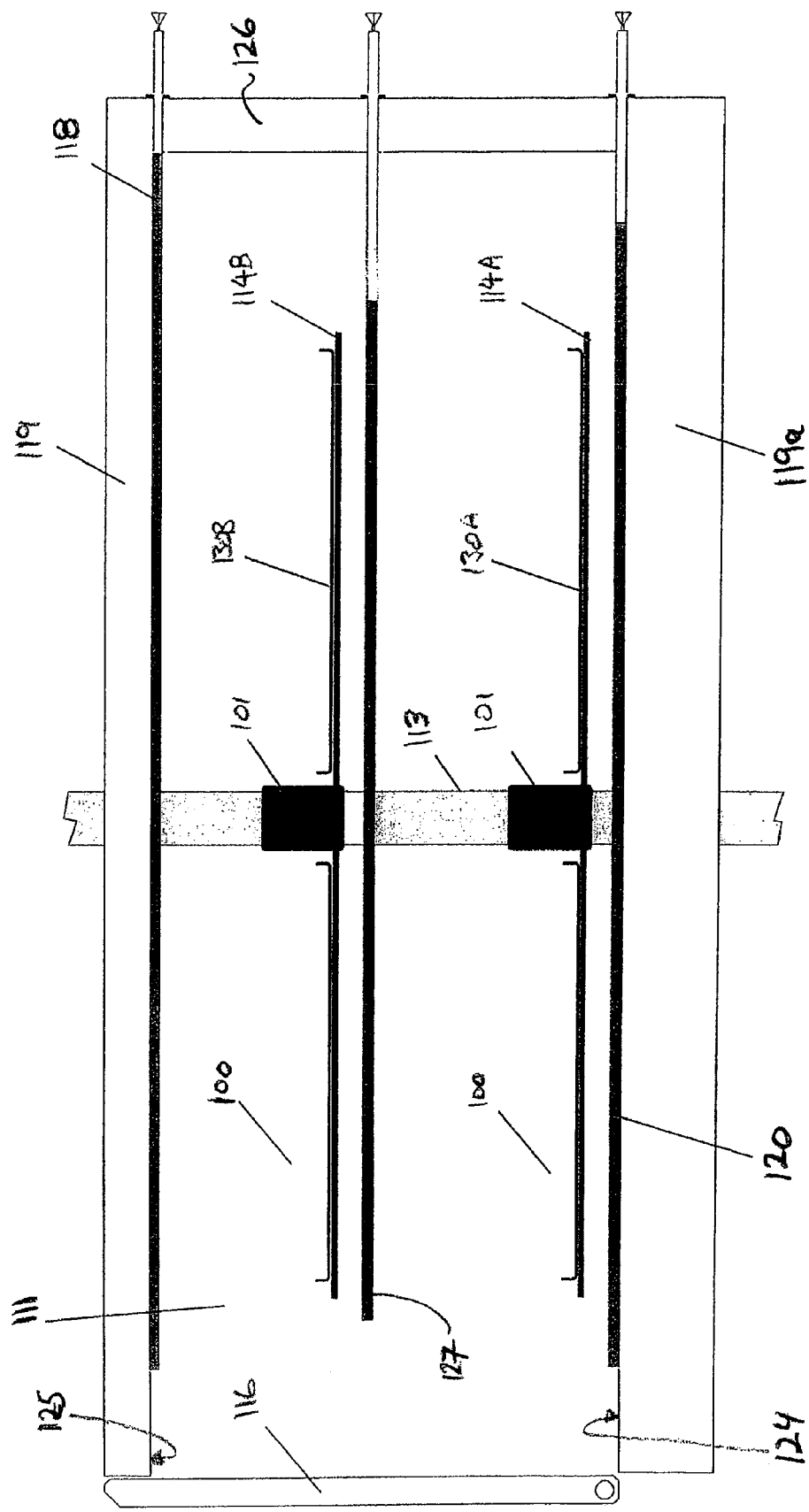
FIG. 6 is a cross-section view of an oven chamber of an oven according to an embodiment of the present invention.

FIG. 6 illustrates an embodiment of the invention. A single compartment 111 is illustrated, although of course the invention could be applied to multi compartment ovens. The oven compartment 111 is defined by top wall 119, bottom wall 119a, rear wall 126, side walls 131 (see FIG. 7) and door 116. The walls 119, 119a, 126, 131 and the door 116 are insulated in conventional fashion. The walls 126, 131 and the door 116 are arranged so that the oven chamber 111 has a more or less octagonal shaped floor 124. A vertical cylindrical shaft 113 is centrally mounted to extend through the oven chamber 111. As in the ROTEL oven of FIG. 1, shaft 13 is, in use, rotationally driven.

An inner surface of the bottom wall 119a defines the floor 124. An inner surface of the top wall 119 defines the ceiling 125.

A lower turntable 114A and an upper turntable 114B are fixed to the vertical shaft 113 via respective collars 101. The lower turntable 114A is spaced a short distance from the floor 124. The upper turntable 114B is vertically spaced along the shaft 113 to occupy an upper half of the oven compartment 111.

The bottom elements 120 extend from the rear wall 126 and extend along the floor 124. The elements 120 underlie the lower turntable 114A. In use, baking trays 130A are positioned on the turntable 114A. This arrangement of the elements under the lower turntable 114A allows for heat to be applied more directly to the baking trays 130A (and in turn to bakery product on the baking trays 130A). The elements 127 extend from the rear wall 126 and are positioned midway between the floor 124 and the ceiling 125 so as to underlie the upper turntable 114B. As in the case of the bottom elements 120 and the turntable 114A, this arrangement allows for the elements 127 to underlie the upper turntable 114B and thereby apply heat more direct to baking trays 130B on the upper turntable 114B.

Top elements 118 extend from a rear wall 126 along the ceiling 125 to supply top heat to bakery product supported by the baking trays 130b and the upper turntable 114b.

Figure 7:
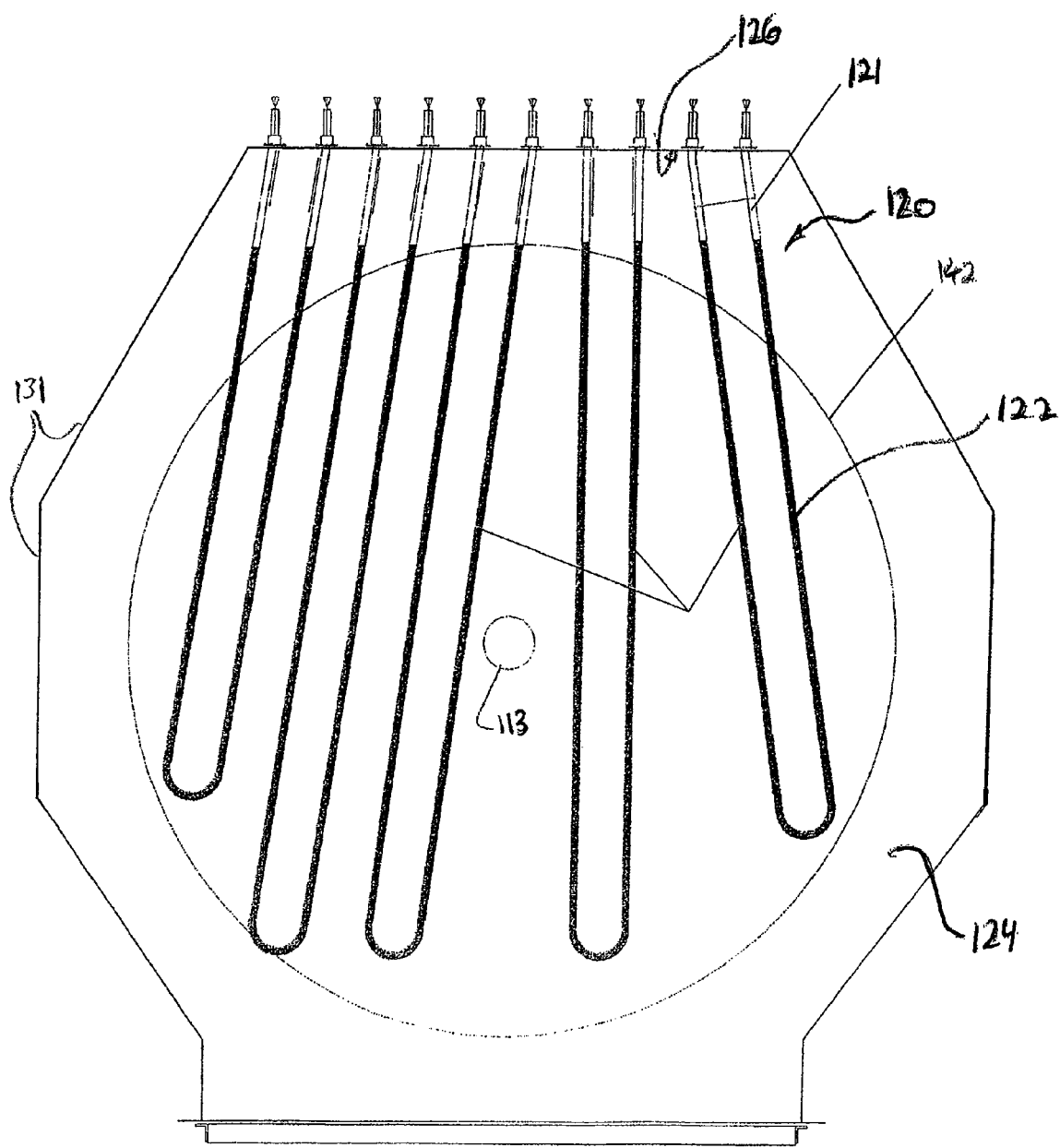
FIG. 7 is a plan view the first heating elements of the oven chamber of FIG. 6.

Ideally the bottom elements 120 each include an active portion 122 and an inactive portion 121, the inactive portion 121 of each element extending from the rear wall 126 to a bottom active region 142 so that the active portion 122 at least predominantly lies within the bottom active region. FIG. 7 illustrates the inactive portions (not shaded) 121 extending to the active portions 122 (shaded). The inactive portions 121 are configured to produce little or no heat. The active portions have a more or less homogenous construction but are found to produce little or no heat over a length of about 25 mm or so adjacent the inactive portions. The illustrated arrangement of elements 120 are thereby arranged to supply heat predominantly to the bottom active region 142.

As illustrated the bottom active region 142 is circular and is concentric to the shaft 113. The bottom active region 142 covers about 66% of the area of the floor 124.

Figure 8:
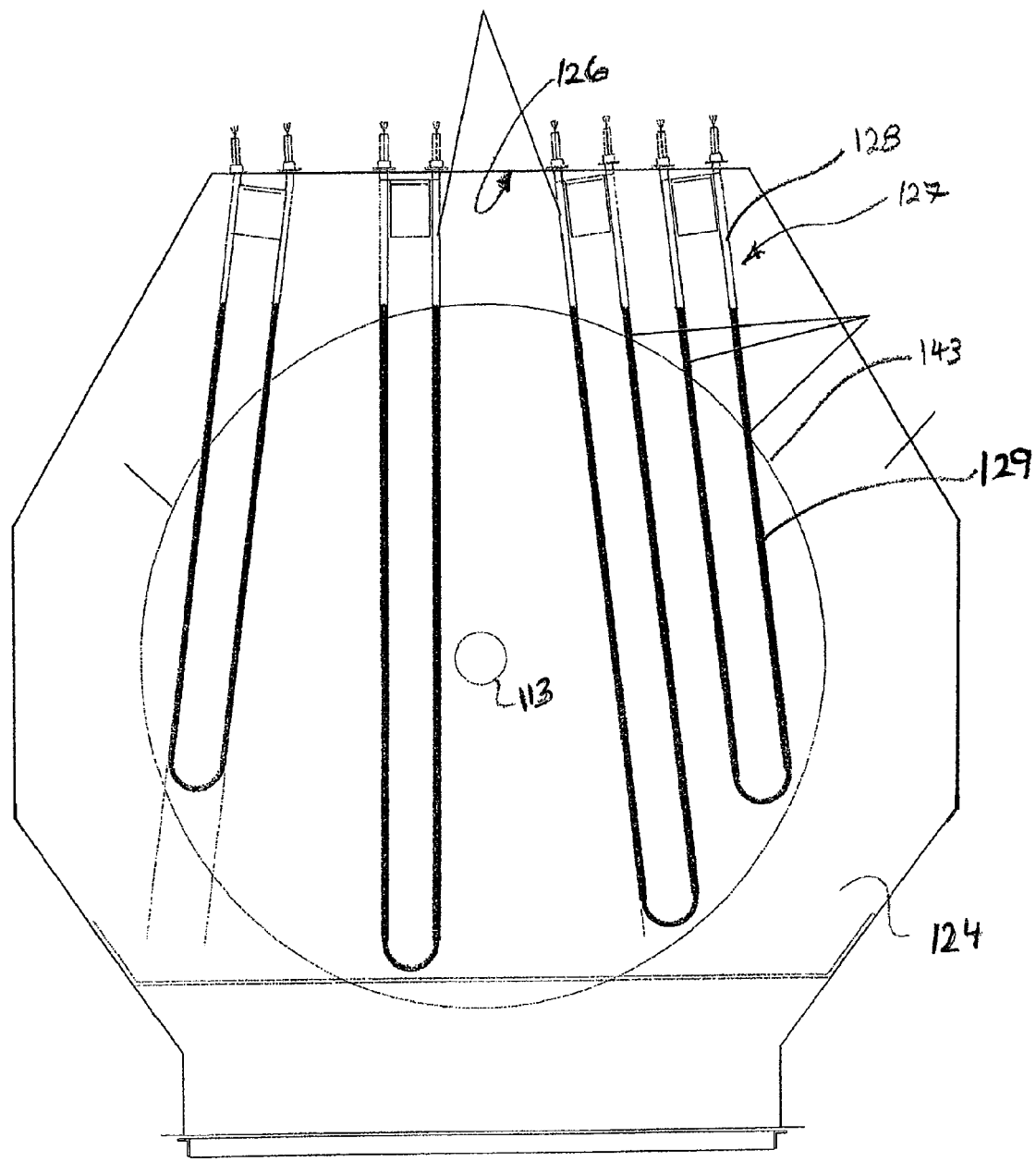
FIG. 8 is a cross-section view of the shield of FIG. 7 in use.

FIG. 8 illustrates the distribution of the middle heating elements 127. Like the elements 120, the elements 127 each include an active portion 129 and an inactive portion 128. The elements 127 are arranged to supply heat predominantly to a middle active region 143. The middle active region 143 is circular and concentric to the shaft 113. The middle active region 143 covers about 50% of the floor area.

The distribution of the upper heating elements 118 across the ceiling 125 is not critical. As discussed below, the upper heating elements 118 supply relatively little power during the operation and primarily serve to assist in aesthetic crust formation.

In this embodiment a sheath 133 (FIGS. 9 and 10) is used to shield bakery product on baking trays 130A of the lower turntable 114A from the middle heating elements 127. The sheath 133 includes an underside 136 and an upper portion 134 which are each formed of sheet steel. The upper portion 134 is shaped to define together with the underside 136 two elongate cavities in which, in use, the active portion 129 of the middle elements 127 is received. The underside 136 is continuous in regions underlying the active portion 129 to perform the shielding function. Centrally mounted apertures intermediate the rods of the active portion 129 are arranged to allow for airflow. The upper portion 134 has multiple large apertures 135 spaced by relatively narrow bridging portions 137 to allow for efficient radiant heat transfer from the active portion 129 of the middle elements 127 upwardly towards the baking trays 130B on the turntable 114B.

Typically the total power of the elements in such an oven compartment 111 is about 6 kW, but this figure can vary depending on the size of the oven and other constraints such as the available power supply. Preferred forms of the oven include a controller, such as a computerized controller, to operate the elements 120, 127, 118. A preferred mode of operating the oven includes the bottom elements 120 providing relatively more power than the upper elements. Ideally the middle elements 127 supply an amount of power equivalent to about 70% to 80% of the power supplied by the bottom elements 120. The top elements 118 play a relatively minor role and typically supply about 5% to 10% of the total power supplied to the oven chamber 111, or more preferably about 8% to 10% of the combined power output of the bottom elements 120 and the middle elements 127.

It has been found that in use that heat from the bottom elements 120 runs past and around the trays 130A on the lower turntable 114A to assist the middle elements 127 to bake the bakery product supported by the trays 130B on the upper turntable 114B. These carefully selected geometries and relative power outputs of the various baking elements have been found to result in a satisfactory bakery product from both the lower and the upper turntables 114A, 114B.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A baking oven comprising:
    a plurality of oven chambers, at least one oven chamber comprising;
        at least one heating means including at least one heating element for generating heat;
        at least one support means including a rotatable turntable for supporting one or more baking trays in a rectangular baking tray position within the heating chamber;
        wherein the at least one oven chamber has an active region under the baking tray position and an inactive region positioned outwardly of the active region, the baking tray position being defined by a rectangle centered on an axis of rotation of the rotatable turntable and the active region outer boundary is defined as being a circle defined by rotation of an outermost corner of the rectangle, each of the at least one heating elements extending from a wall of the oven chamber into the active region and beneath the baking tray position, each element having an inactive portion and an active portion, the inactive portion extending from the wall to the active portion and the active portion extending only as far as beneath the baking tray position.

2. The baking oven of claim 1 wherein the active region outer boundary is half way between a circle defined by rotation of an outermost corner of the rectangle and a circle defined by rotation of the nearest approach of an edge of the rectangle.

3. The baking oven of claim 1 wherein the at least one heating element is arranged to provide more than 2 times greater power density to the active region than to the inactive region.

4. The baking oven of claim 1 wherein the at least one heating element is arranged to provide 2.5 to 3.5 times greater power density to the active region than to the inactive region.

5. The baking oven of claim 1 wherein the at least one heating element is arranged to provide 2.9 to 3.1 times greater power density to the active region than to the inactive region.

6. The baking oven of claim 1 wherein the at least one heating means includes a plurality of heating elements, wherein at least one of the plurality of heating elements includes a steaming device, the steaming device having at least one steam outlet, at least one heat sink member to provide a heat source to convert water introduced into the steam generation chamber into steam and configured for venting steam into the oven chamber substantially outside of the active region.

7. The baking oven of claim 6 wherein the at least one steam outlet is positioned adjacent a wall defining the baking chamber.

8. The baking oven of claim 7 wherein the at least one heat sink member is a strip of metal bar having a thermal mass sufficient to convert an amount of water to steam sufficient to produce the required baking environment.

9. The baking oven of claim 1 wherein the plurality of oven chambers, each has heating elements for generating heat arranged to underlie respective baking tray positions.

10. The baking oven of claim 1 wherein the at least one oven chamber further comprises a second rotatable turntable within the oven compartment for supporting one or more baking trays above the baking trays on the first rotatable turntable; and at least one second heating element intermediate the first rotatable turntable and a second rotatable turntable for supplying heat to an underside of the baking trays on the second rotatable turntable; the second rotatable turntable being movable relative to the at least one second heating element.

11. A baking oven including:
    a plurality of oven chambers, at least one oven chamber having a floor and a ceiling and comprising:
        a first rotatable turntable within the at least one oven chamber for supporting one or more baking trays above the floor, a first baking tray position being defined by a rectangle centered on an axis of rotation of the rotatable turntable, a first active region outer boundary being defined as a circle defined by rotation of an outermost corner of the rectangle;
        the at least one oven chamber having a first active region under the first baking tray position and an inactive region positioned outwardly of the first active region;
        at least one first heating element intermediate the floor and the first rotatable turntable for supplying heat to an underside of the first baking tray position; each of the at least one first heating elements extending from a wall of the oven chamber into the first active region and beneath the first baking tray position, each of the at least one first heating elements having an inactive portion and an active portion, the inactive portion extending from the wall to the active portion and the active portion extending only as far as beneath the first baking tray position;
        the first rotatable turntable being movable relative to the at least one first heating element;
        a second a rotatable turntable within the oven chamber for supporting one or more baking trays above the baking trays on the first rotatable turntable; a second baking tray position being defined by a second rectangle centered on an axis of rotation of the second rotatable turntable, a second active region outer boundary being defined as a circle defined by rotation of an outermost corner of the second rectangle;

a second active region under the second baking tray position and an inactive region positioned outwardly of the second active region; and at least one second heating element intermediate the first rotatable turntable and a second rotatable turntable for supplying heat to an underside of the baking trays on the second rotatable turntable; the second rotatable turntable being movable relative to the second heating elements; each of the at least one second heating elements extending from a wall of the oven chamber into the second active region and beneath the second baking tray position, each of the at least one second heating elements having an inactive portion and an active portion, the inactive portion extending from the wall to the active portion and the active portion extending only as far as beneath the second baking tray position.

12. The baking oven of claim 11 wherein the at least one oven chamber further comprises a third heating means located intermediate the second rotatable turntable and a ceiling of the oven for supplying heat to bakery product on the baking trays on the second rotatable turntable.

13. The baking oven of claim 12 further comprising a shield to shield the bakery product on baking trays on the first rotatable turntable from the at least one second heating element.

14. The baking oven of claim 13 wherein the first rotatable turntable and the second rotatable turntable are at least approximately aligned so that a center of the trays on the second rotatable turntable overlies a center of the trays on the first rotatable turntable.

15. The baking oven of claim 1 or claim 10 wherein the first active region is 63% to 69% of the size of the floor of the at least one oven chamber by area.

16. The baking oven of claim 15 wherein the at least one oven chamber has a second active region is 46% to 54% of the size of the floor of the at least one oven chamber by area.

17. The baking oven of claim 11 wherein the at least one second heating element is configured to deliver between 70-80% of the power of the at least one first heating element.

18. The baking oven of claim 10 wherein the at least one oven chamber further comprises at least one third heating element located intermediate the second rotatable turntable and a ceiling of the oven for supplying heat to bakery product on the baking trays on the second rotatable turntable.

19. The baking oven of claim 11 wherein the second active region outer boundary is between a circle defined by rotation of an outermost corner of the rectangle and a circle defined by rotation of the nearest approach of an edge of the second rectangle to the axis.

20. The baking oven of claim 11 wherein the second active region outer boundary is halfway between a circle defined by rotation of an outermost corner of the rectangle and a circle defined by rotation of the nearest approach of an edge of the second rectangle.

21. The baking oven of claim 1 wherein substantially all of the active portion of each heating element is beneath the baking tray position.

22. The baking oven of claim 11 wherein substantially all of the active portions of each of the at least one first and second heating elements respectively lie beneath the first and second baking tray position.

* * * * *

UNITED STATES PATENT AND TRADEMARK OFFICE
CERTIFICATE OF CORRECTION

PATENT NO. : 8,389,907 B2  
APPLICATION NO. : 12/607311  
DATED : March 5, 2013  
INVENTOR(S) : P. E. Willett Page 1 of 1

It is certified that error appears in the above-identified patent and that said Letters Patent is hereby corrected as shown below:

In the Claims:

| COLUMN | LINE | ERROR |
|---|---|---|
| 10 (Claim 11, | 66 line 27) | "a second a rotatable" should read --a second rotatable-- |

Signed and Sealed this  
Twenty-second Day of October, 2013

Teresa Stanek Rea  
*Deputy Director of the United States Patent and Trademark Office*